July 26, 1949.  E. A. GOODWYN  2,477,369
STEERING APPARATUS
Filed May 16, 1947

Inventor
E. A. Goodwyn
By Randolph & Beavers
Attorneys

Patented July 26, 1949

2,477,369

UNITED STATES PATENT OFFICE 2,477,369

STEERING APPARATUS

Edwin A. Goodwyn, Norfolk, Va.

Application May 16, 1947, Serial No. 748,425

3 Claims. (Cl. 74—498)

This invention appertains to steering apparatus such as may be efficiently used on automobiles, commercial trucks, industrial or warehouse trucks, motor boats, farm and other tractors and in connection with any steering gear or like apparatus in which the features of this invention may be conveniently incorporated.

An important object of the invention is to provide a steering apparatus which because of its particular gear construction and action permits a more quicker changing of the course of the particular vehicle than is possible now with conventional mechanism of this character.

Another object of the invention is to provide a steering apparatus that may be conveniently installed at low cost and likewise maintained after its installation.

A further object of the invention is to provide a steering mechanism wherein through the use of a chain and sprocket wheel drive less movement of the steering wheel is required to effect the ultimate movement of the steerable wheels of the vehicle or other controlling apparatus with which the steering wheel is connected.

These and various other objects and advantages of the invention will become apparent to the reader of the following description.

Figure 1:
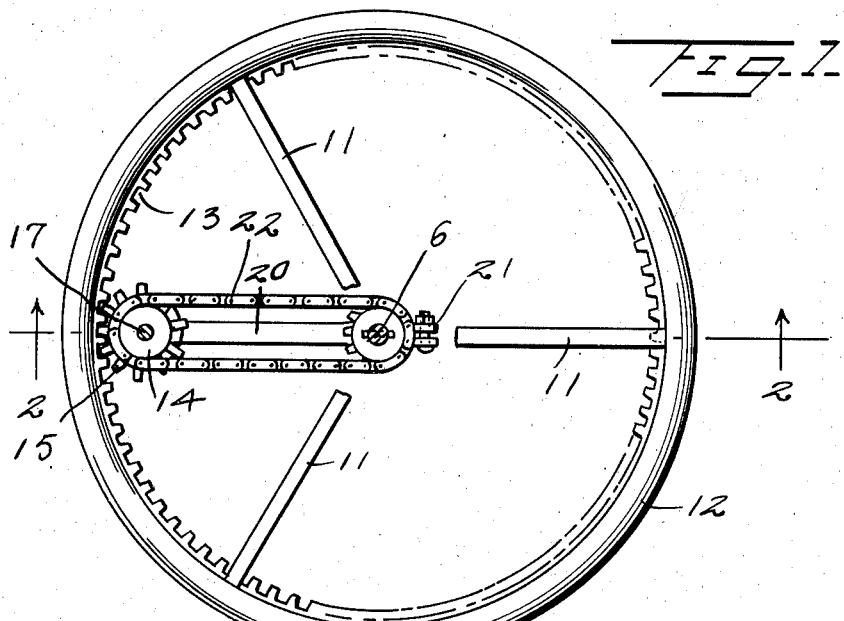
Figure 1 is a top plan view of the steering wheel assembly with certain parts in section to disclose the sprocket wheels and chain drive.
Figure 2:
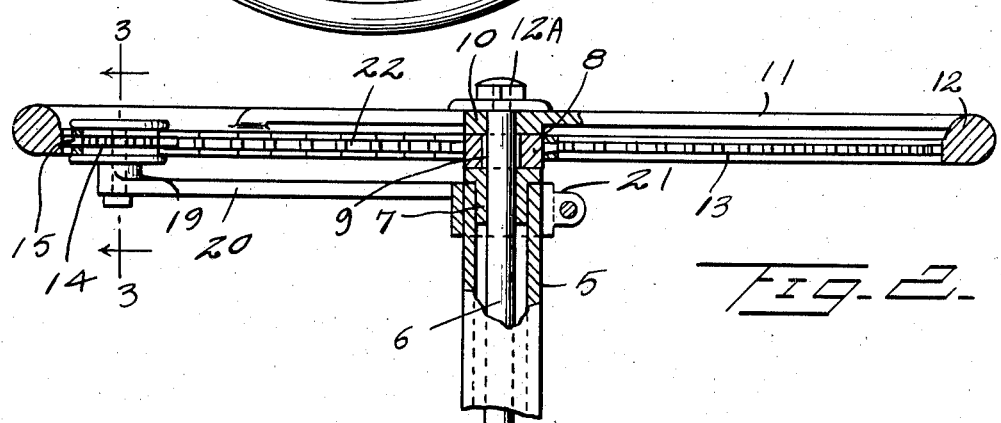
Figure 2 is an enlarged fragmentary vertical sectional view taken substantially on line 2—2 of Figure 1.
Figure 3:
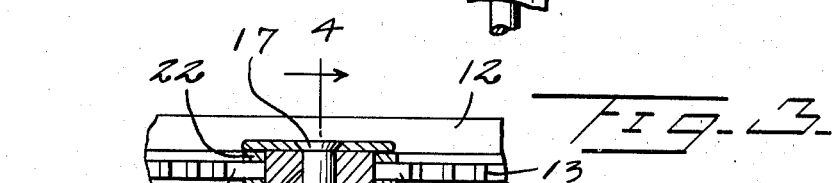
Figure 3 is a fragmentary vertical sectional view taken substantially on line 3—3 of Figure 2.
Figure 4:
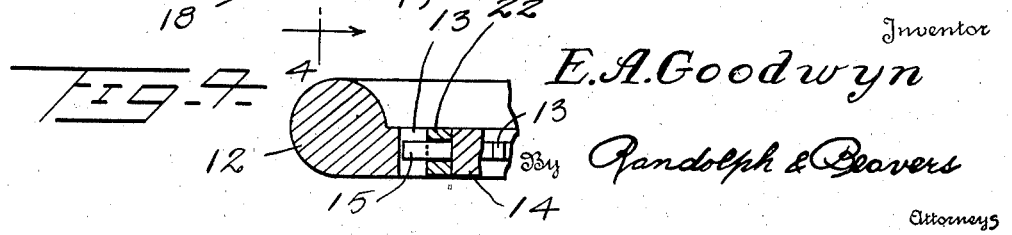
Figure 4 is a vertical sectional view taken on line 4—4 of Figure 3.

Referring to the drawing, numeral 5 denotes an elongated tubular housing through which a steering wheel shaft 6 extends, the same protruding beyond the upper end of the housing, to the extent shown in Figure 2. A flanged bushing 7 is inserted in the upper end of the housing 5 and through this projects the shaft 6, the upper end of the bushing 7 forming a bearing for a cog wheel 8, this being keyed to the shaft 6 as at 9.

Rotatable on the upper end of the shaft 6 is a hub 10 from which spokes 11 radiate and connect to a steering wheel 12. A cap member, internally threaded and denoted by numeral 12A is preferably disposed over a reduced threaded portion of the upper end of the shaft 6, for holding the parts 10 and 8 in substantially snug relation.

At the lower inside portion of the annulus or wheel 11 is a continuous ring gear 13, with which the sprocket teeth of a wheel 14 mesh, the teeth being denoted by the numeral 15. The sprocket wheel 14 consists of a spool-like structure 16 from which the teeth 15 project, the spool-like structure having a downwardly disposed pintle 17 axially therethrough to act as a bearing, the latter having a threaded portion 18 depending through the outer and thickened portion 19 of an arm 20.

The arm 20 projects outwardly from a clamp collar 21 which embraces the upper end of the shaft housing 5, as in the manner shown in Figure 2.

The teeth 15 are sufficiently long to engage the teeth of the ring gear 13 after passing through a sprocket chain 22, this sprocket chain being also trained around the sprocket wheel 8 on the upper end of the shaft 6.

Thus it can be seen, that the wheel 11 is free to rotate on the upper end of the shaft 6 and that motion is imparted to the shaft 6 only by way of the sprocket 14, chain 22 and sprocket 8.

In the operation of the assembly, with the parts constructed and arranged as above recited, when rotary motion is imparted to the wheel 11, the long teeth 15 of the sprocket 14, meshing with the ring gear 13 results in the rotation of the sprocket wheel 14 and from thence by way of the chain 22, motion is imparted to the sprocket wheel 8 and steering shaft 6. This cog and chain and gear arrangement between the steering wheel and the steering shaft 6 increases the ratio of drive to a substantial extent and to the end that quicker turns and accomplishments of the steering mechanism are attained with less movement of the steering wheel and exertion on the part of the driver than is possible with the use of present day steering wheels.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A steering mechanism comprising a steering wheel, a shaft upon which the steering wheel is rotatably mounted, said wheel being provided with a ring gear at the inner side thereof, an outer sprocket wheel, a sprocket wheel keyed to the shaft, a sprocket chain trained over said wheels, the outer sprocket wheel being provided with elongated teeth projecting through the chain and outwardly therefrom and meshing with the ring gear of the steering wheel.

2. A steering mechanism comprising a steering wheel, a shaft upon which the steering wheel is rotatably mounted, said wheel being provided with a ring gear at the inner side thereof, an outer sprocket wheel, an inner sprocket wheel keyed to the shaft, a sprocket chain trained over said wheels, the outer sprocket wheel being provided with elongated teeth which pass through the chain and project outwardly therefrom and mesh with the ring gear of the steering wheel, a housing for the shaft and an arm projecting laterally from the housing and rotatably supporting the outer sprocket wheel.

3. A steering mechanism comprising a steering wheel, a rotatable steering shaft upon which the steering wheel is rotatably mounted for turning movement relative to the shaft, said wheel being provided with a ring gear at the inner side thereof, an outer sprocket wheel, a sprocket wheel carried by the shaft, a sprocket chain trained over said wheels, the outer sprocket wheel being provided with elongated teeth which project through the chain and outwardly therefrom and mesh with the ring gear of the steering wheel, a housing through which the shaft is rotatably mounted, and an arm projecting laterally from the housing and rotatably supporting the outer sprocket wheel, and a flanged bushing in the upper portion of the housing surrounding the shaft and upon which the inner sprocket wheel bears.

EDWIN A. GOODWYN.

REFERENCES CITED

The following references are of record in the file of this patent:

UNITED STATES PATENTS

| Number | Name | Date |
|---|---|---|
| 470,927 | Edison | Mar. 15, 1892 |
| 687,146 | Fleckenstein | Nov. 19, 1901 |
| 1,493,128 | Rollag | May 6, 1924 |
| 1,877,338 | Kottlowski | Sept. 13, 1932 |
| 1,885,417 | Cremer | Nov. 1, 1932 |